Feb. 23, 1954     R. A. SANDBERG     2,669,884
STRAIGHT PULL BRAKE LEVER ASSEMBLY
Filed Dec. 5, 1947                    2 Sheets-Sheet 1
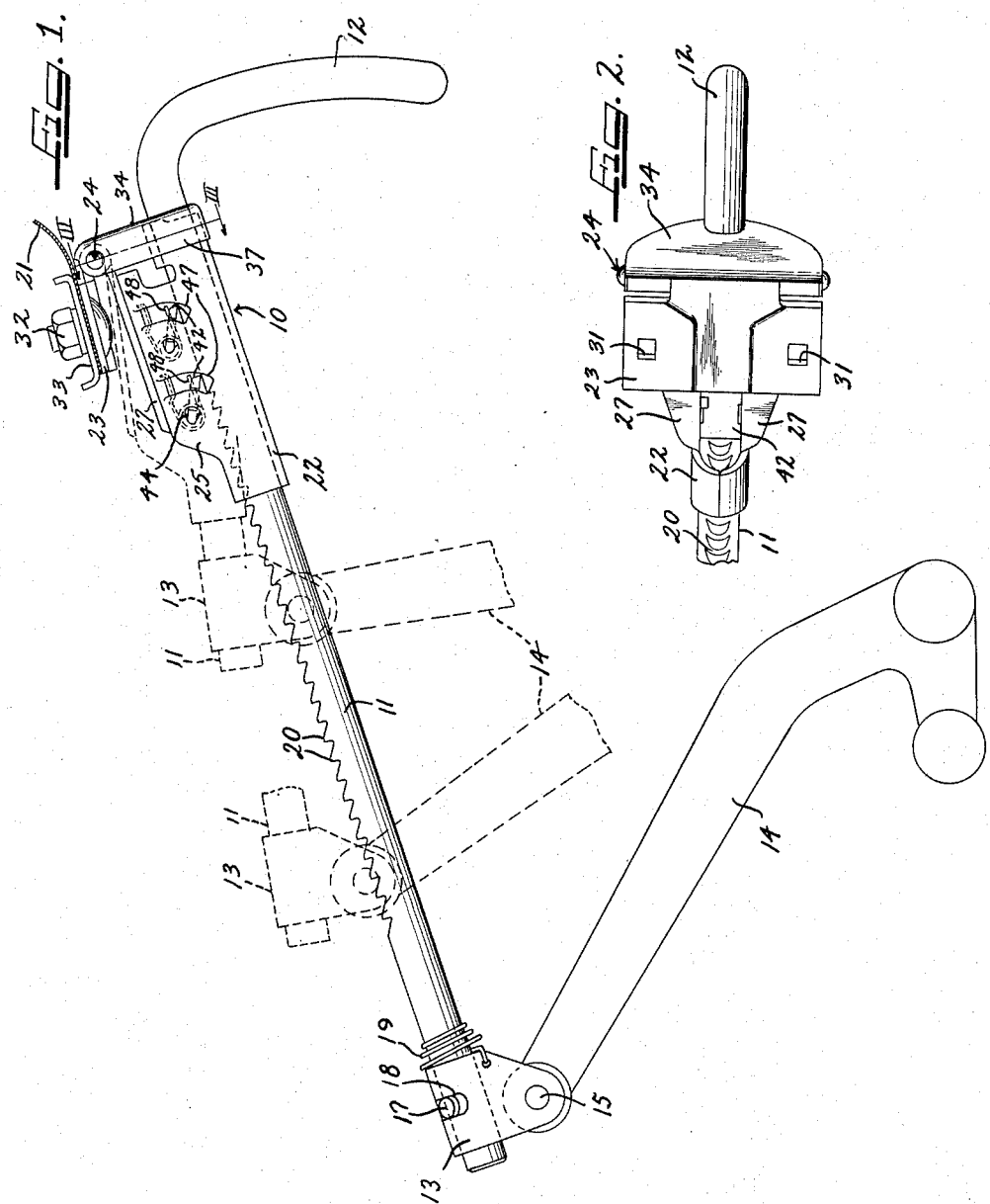
Inventor
RAY A. SANDBERG Feb. 23, 1954  R. A. SANDBERG  2,669,884
STRAIGHT PULL BRAKE LEVER ASSEMBLY
Filed Dec. 5, 1947
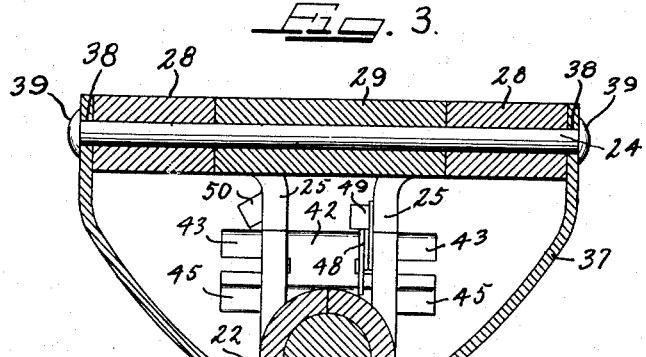
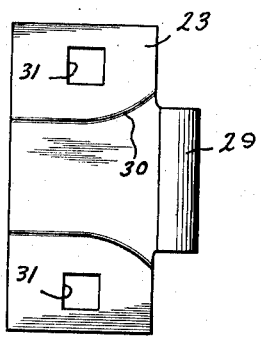
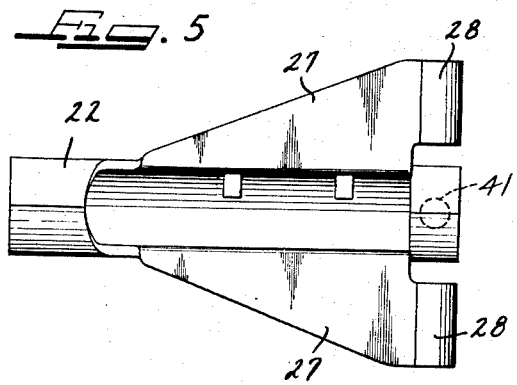
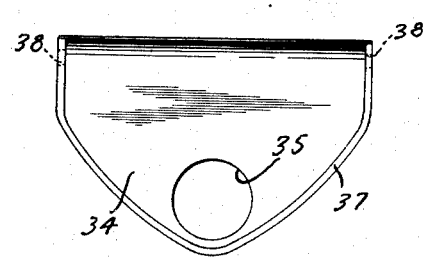
Ray A. Sandberg Patented Feb. 23, 1954

2,669,884

UNITED STATES PATENT OFFICE 2,669,884

STRAIGHT PULL BRAKE LEVER ASSEMBLY

Ray A. Sandberg, Waukegan, Ill., assignor to Houdaille-Hershey Corporation, Detroit, Mich., a corporation of Michigan Application December 5, 1947, Serial No. 789,885

8 Claims. (Cl. 74—503)

The present invention relates to improvements in brake lever assemblies and more particularly concerns an improved straight pull brake lever assembly adapted for use in automobiles and the like.

An important object of the present invention is to provide a low cost, simple, and efficient straight pull brake lever assembly of the type which is especially useful in connection with the emergency brakes of a motor vehicle.

Another object of the invention is to provide in a brake lever assembly improved guiding means for a reciprocable, but also swingable ratchet rod for setting and releasing the associated brakes.

A further object of the invention is to provide an improved pivotal mounting for the guiding and controlling structure for a straight pull actuating rod of a brake lever assembly.

Still another object of the invention is to provide an improved, simple and economically constructed guiding and control structure for a straight pull brake lever assembly.

Other objects, advantages, and features of the present invention will be readily apparent from the following detailed description of a preferred embodiment thereof taken in conjunction with the accompanying two sheets of drawings wherein:

Figure 1 is a side elevational view of a brake lever assembly embodying the features of the invention;

Figure 2 is a fragmentary top plan view of the brake lever assembly;

Figure 3 is an enlarged vertical sectional detail view taken substantially on the line III—III of Figure 1;

Figure 4 is a top plan view of the supporting hinge member of the assembly;

Figure 5 is a top plan view of the pawl cage and rod guiding member of the assembly; and Figure 6 is an inside elevational view of the guide housing and pawl cage assembly.

The present invention is especially concerned with a supporting, reciprocally guiding and controlling structure 10 for a reciprocable and rotary ratchet rod 11. The latter has a handle 12 at one end and formed integral therewith while at the opposite end it is connected as by means of a clevis 13 with a brake lever 14. The clevis is connected to the brake lever through the medium of a pivot pin 15 or the like and has the end, herein the forward end, of the ratchet rod 11 disposed rotatably therein, a pin 17 projecting from the rod into a slot 18 affording a connection between the rod and the clevis and limiting rotary relative movement of the rod in the clevis. A torsional helical spring 19 connected to the clevis and to the ratchet rod is adapted to return the ratchet rod normally to a given oscillation limit with respect to the clevis 13, herein to the position wherein the handle 12 of the rod extends downwardly while a series of ratchet teeth 20 on the rod thus normally extend upwardly.

Since in the reciprocal movements of the ratchet rod 11, the forward end thereof which is attached to the lever 14 is caused to move through an arcuate path, substantially as indicated in the dash outline positions thereof in Figure 1, the supporting and control structure 10 is preferably so constructed and arranged as to accommodate this movement, while at the same time remaining in a given relationship to that portion of the associated vehicle to which it is attached, such, for example, as the instrument panel identified at 21. To this end, the structure 10 comprises a guiding tube member 22 which is hingedly connected to the instrument panel 21 as by means of a hinge plate 23, a hinge pin 24 serving to connect the hinge plate and the guide member together hingedly.

The guide member 22 preferably comprises a generally tubular sheet metal structure through which the rod 11 is reciprocally movable and also rotatably movable. Intermediate its ends the tubular member 22 is formed with a pair of upstanding wall extensions 25 which are formed with oppositely extending coplanar extremity wing flanges 27 which preferably flare to their greatest width at the rear end of the tubular member and are formed with respective hinge curls or journals 28 (Figures 3 and 5).

The hinge plate 23 is formed at its rear edge with a centered hinge curl or journal 29 (Figures 3 and 4) which is of a length to extend coaxially between the hinge curls 28 for connection hingedly by means of the hinge pin 24. Intermediately the hinge plate may be formed with a reinforcing offset formation 30 while adjacent to its ends it has respective apertures 31, herein preferably square, for receiving the shanks of attaching bolts 32 by which the assembly is adapted to be secured to the underturned lower portion of the dash panel 21, a square washer plate 33 being preferably located at the upper side of the instrument panel flange for clamping such flange between the hinge plate 23 and the washer plate.

It will thus be apparent that as the ratchet rod 11 is moved reciprocally in the tubular housing member 22 and the forward end of the rod is swung up and down due to its connection with the lever 14, the housing 22 will swing with the rod about the axis provided by the hinge pin 24. Due to the substantial lateral extent of the elongated hinge of the assembly to opposite sides of the pull rod, satisfactory stability in service is attained.

A finishing and reinforcing plate 34 is preferably secured to the rear end of the housing structure 10, and has the main body portion thereof formed with an aperture 35 which in assembly registers with the rod guiding tube passage in the member 22. A forwardly turned flange 37 on the member 34 engages the outer ends of the hinged journals 28 and has respective holes 38 therethrough registering with the pin bores of the hinge structure so that the opposite ends of the hinge pin 24 may extend therethrough and rivet heads or the like 39 on the hinge pin engage the plate flange 37 retainingly. At the under portion of the plate flange 37, it is connected to the member 22 in any appropriate manner, such for example, as by having a portion thereof upset retainingly as indicated at 40 into a bore 41 provided for this purpose in the adjacent under portion of the member 22.

Incremental brake setting adjustment is effected by means of pawls 42 which are carried by the member 22 between the wall extensions 25 and are engageable with the ratchet teeth 20 of the pull rod. Heerin the pawl members 42 are in the form of flat generally knife edge plate-like elements having coaxial oppositely extending pivot arms 43 at the sides thereof at their forward portions and operatively engage through respective pivot openings 44 in the wall members 25, while idler arms 45 at the opposite or rear portions of the pawl members work through respective arcuate slots 47 in the wall members 25. If desired, biasing torsion springs 48 may be provided for biasing the pawls 42 positively into engagement with the ratchet teeth 20, the walls 25 being provided with appropriate tensioning lugs 49 or 50 at the upper ends of the arcuate clearance slots 47. For a more comprehensive disclosure of the particular pawl and ratchet arrangement utilized herein, reference may be had to my copending application, Serial No. 779,183, filed October 10, 1947, now patent No. 2,543,509 dated February 27, 1951.

In the operation of the brake lever assembly, the handle 12 is grasped when the brake is to be set and the pull rod 11 drawn rearwardly, thereby rocking the lever 14 and swinging the forward end of the rod 11 upwardly as it moves rearwardly. Accommodating this action of the pull rod 11, the supporting and guiding housing 22 swings hingedly about its pivot 24, and the pawls 48 ratchet over the teeth 20 until the appropriate setting pressure has been applied, in which condition the pawls retain the rod 11. To release the brake the handle 12 is turned, in the present instance counterclockwise, until the ratchet teeth 20 clear the pawls 42, whereupon the pull rod 11 will slide forwardly, generally under the tension of the brake cable or cables.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In combination in a brake lever assembly including a reciprocal and swingable rod member, a tubular guide for said rod member including a pair of spaced wall members including coplanar flanges, said flanges having coaxial spaced hinge journals, and a hinge plate having a hinge journal coaxially disposed between said housing hinge journals, and hinge pin means pivotally connecting the journals.

2. In combination in a brake lever assembly including a reciprocal and swingable rod member, a tubular guide for said rod member including a pair of spaced wall members including coplanar flanges, said flanges having coaxial spaced hinge journals, and a hinge plate having a hinge journal coaxially disposed between said housing hinge journals, and hinge pin means pivotally connecting the journals, said walls carrying pawls cooperable with the rod and the rod having ratchet teeth cooperable with the pawls.

3. In combination in a brake lever assembly of the character described, a tubular ratchet rod guiding and supporting housing, a hinge plate having hinge connection with said housing, said hinge plate being apertured to accommodate attachment bolt means for attaching the assembly to a stationary part of a vehicle with which the assembly is used, and a finishing plate having a flange structure secured to said housing and extending adjacent to the hinge plate.

4. In combination in a straight pull brake lever assembly, a pull rod, a housing for the pull rod including a guide member and a transverse finishing plate at the rear end of the guide member having an aperture therethrough for passage of the pull rod and including a forwardly directed flange engaging the guide member, said guide member having an aperture therein in that portion engaged by the flange, and a portion of the flange being upset into said aperture for interconnecting the finishing plate and the guide member.

5. In combination in a brake actuating assembly of the character described, a brake actuating rod guiding and supporting housing, a hinge member having hinge connection with said housing and being constructed and arranged for attachment to a stationary part of a vehicle or the like with which the assembly may be used, a hinge pin completing said hinge connection, and a separately formed finishing plate cooperatively assembled with the housing and concealing said hinge connection, said finishing plate having side flange portions substantially secured in place by the opposite ends of said hinge pin.

6. In combination in a vehicle brake lever assembly, an elongated pull rod having a handle at its rear end and means at its forward end for attachment to a brake lever, a guide structure having a rear end bearing portion encircling and reciprocably and rotatably supporting the rod, said guide structure having spaced vertical wall portions extending in front to rear direction forwardly from said bearing portion at respectively opposite sides of the rod, means supported by said wall portions for retaining the rod in incremental rearwardly pulled brake setting positions and releasable from the retaining relation to the rod by rotation of the rod, said walls having portions thereon extending rearwardly and laterally to a substantial extent toward respective opposite sides away from the rod and merging at the rear of the structure and substantially above said bearing portion with transverse journal means projecting substantially above the tops of said walls, a hinge plate disposed above the guide structure and having a body portion projecting forwardly from said journal means and a hinge journal on the rear margin thereof transverse to the axis of the rod and coaxially aligned with the hinge journal means on said guide structure, and a hinge pin extending through said hinge plate marginal journal and said hinge journal means and pivotally connecting the guide structure and hinge plate for relative pivotal movement, said hinge plate having means for attachment to a supporting portion of a vehicle.

7. In combination in a vehicle brake lever assembly, an elongated pull rod having a handle at its rear end and means at its forward end for attachment to a brake lever, a guide structure having a rear end bearing portion encircling and reciprocably and rotatably supporting the rod, said guide structure having spaced vertical wall portions extending in front to rear direction forwardly from said bearing portion at respectively opposite sides of the rod, means contained between said wall portions for retaining the rod in incremental rearwardly pulled brake setting positions and releasable from the retaining relation to the rod by rotation of the rod, said walls having portions thereon extending rearwardly and laterally to a substantial extent toward respective opposite sides away from the rod and said portions carrying integrally therewith at the rear of the structure substantially above said bearing portion transverse journal means projecting substantially above the tops of said walls, a hinge plate disposed above the guide structure and having a body portion projecting forwardly from said journal means and a hinge journal on the rear margin thereof transverse to the axis of the rod and coaxially aligned with the hinge journal means on said guide structure, and a hinge pin extending through said hinge plate margin journal and said hinge journal means and pivotally connecting the guide structure and hinge plate for relative pivotal movement, said hinge plate having means for attachment to a supporting portion of a vehicle.

8. In a vehicle structure including an instrument panel having a lower downwardly facing flange, a brake actuating assembly supported by said flange and comprising an attachment member attached to said flange and having journal means thereon disposed on an axis transverse to the front to rear axis of the vehicle, an elongated pull rod having a handle at its rear end and means at its forward end for operative connection to a brake setting member, and a guide structure reciprocably supporting the rod, said guide structure carrying means for retaining the rod in incremental rearwardly pulled brake setting positions and releasable from the retaining relation to the rod for forward brake-releasing movement of the rod, said guide structure having integral journal means thereon on an axis between and spaced from both said panel and said rod and hingedly connected to the journal means on said member to enable up and down swinging movement of said guide structure about the axis of the journal means in the reciprocal movements of the pull rod, said hingedly connected journal means providing a hinge extending to a distance at each of the opposite sides of the plane of swinging movement of the pull rod equal to at least about three times the diameter of the rod to afford effective lateral stability in the assembly.

RAY A. SANDBERG.

References Cited in the file of this patent

UNITED STATES PATENTS

| Number | Name | Date |
| --- | --- | --- |
| 543,328 | Bartel | July 23, 1895 |
| 559,951 | Rhind | May 12, 1896 |
| 597,947 | Bragger | Jan. 25, 1898 |
| 820,581 | Londe | May 15, 1906 |
| 984,594 | O'Rourke | Sept. 12, 1911 |
| 1,692,883 | Bennett | Nov. 27, 1928 |
| 2,177,456 | Irving | Oct. 24, 1939 |
| 2,196,165 | Adams | Apr. 2, 1940 |
| 2,295,792 | Jandus | Sept. 15, 1942 |
| 2,304,356 | Heller | Dec. 8, 1942 |
| 2,309,636 | Fergueson | Feb. 2, 1943 |
| 2,377,691 | Jandus | June 5, 1945 |

FOREIGN PATENTS

| Number | Country | Date |
| --- | --- | --- |
| 14,666 | Great Britain | July 10, 1908 |
| 2,200 | France | Jan. 20, 1904 |

(Addition to No. 310,110)